Nov. 6, 1923.                                              1,473,125
E. A. RUTH
AUTOMATIC STOP MECHANISM FOR PHONOGRAPHS
Filed April 9, 1921                    3 Sheets-Sheet 3
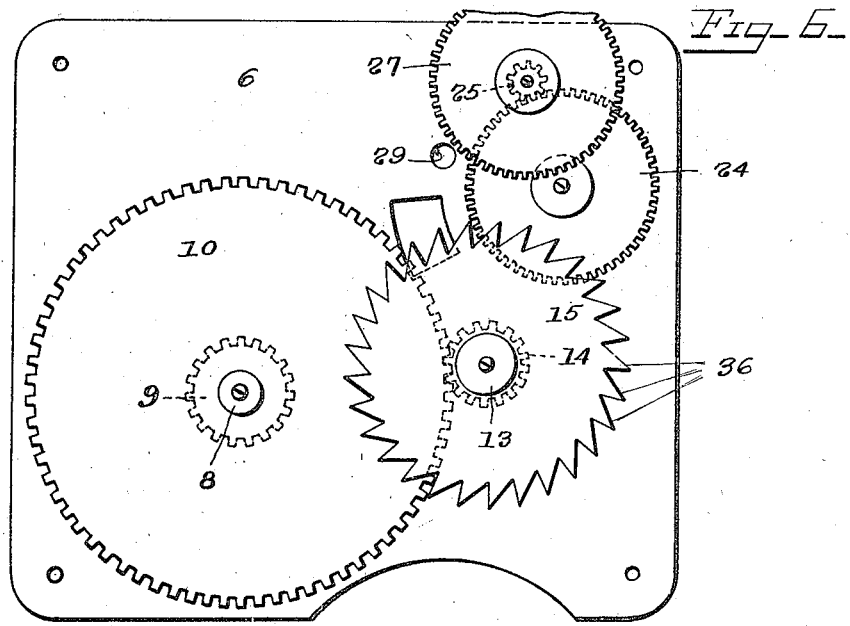
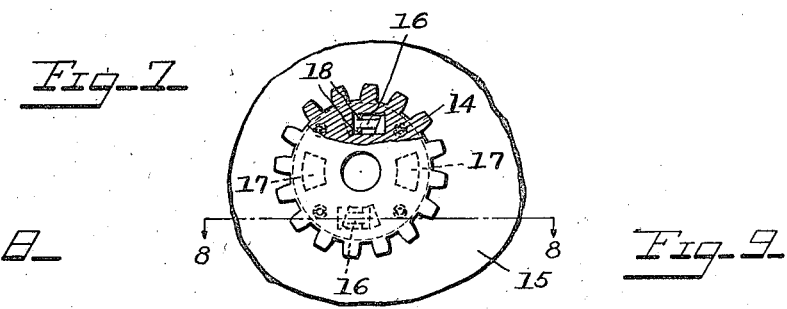
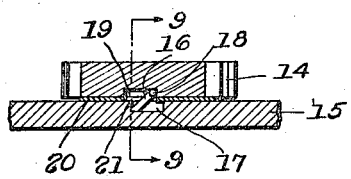
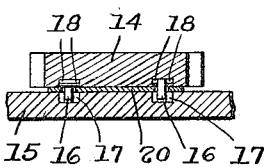
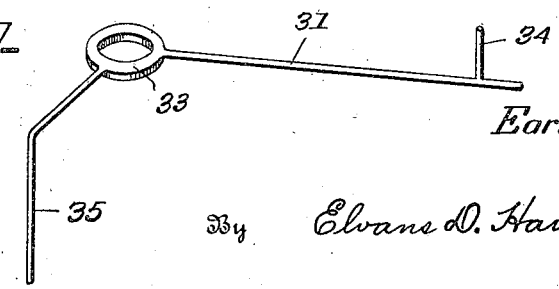
Inventor
Earl A. Ruth.
By Evans D. Haines.
Attorney Patented Nov. 6, 1923.

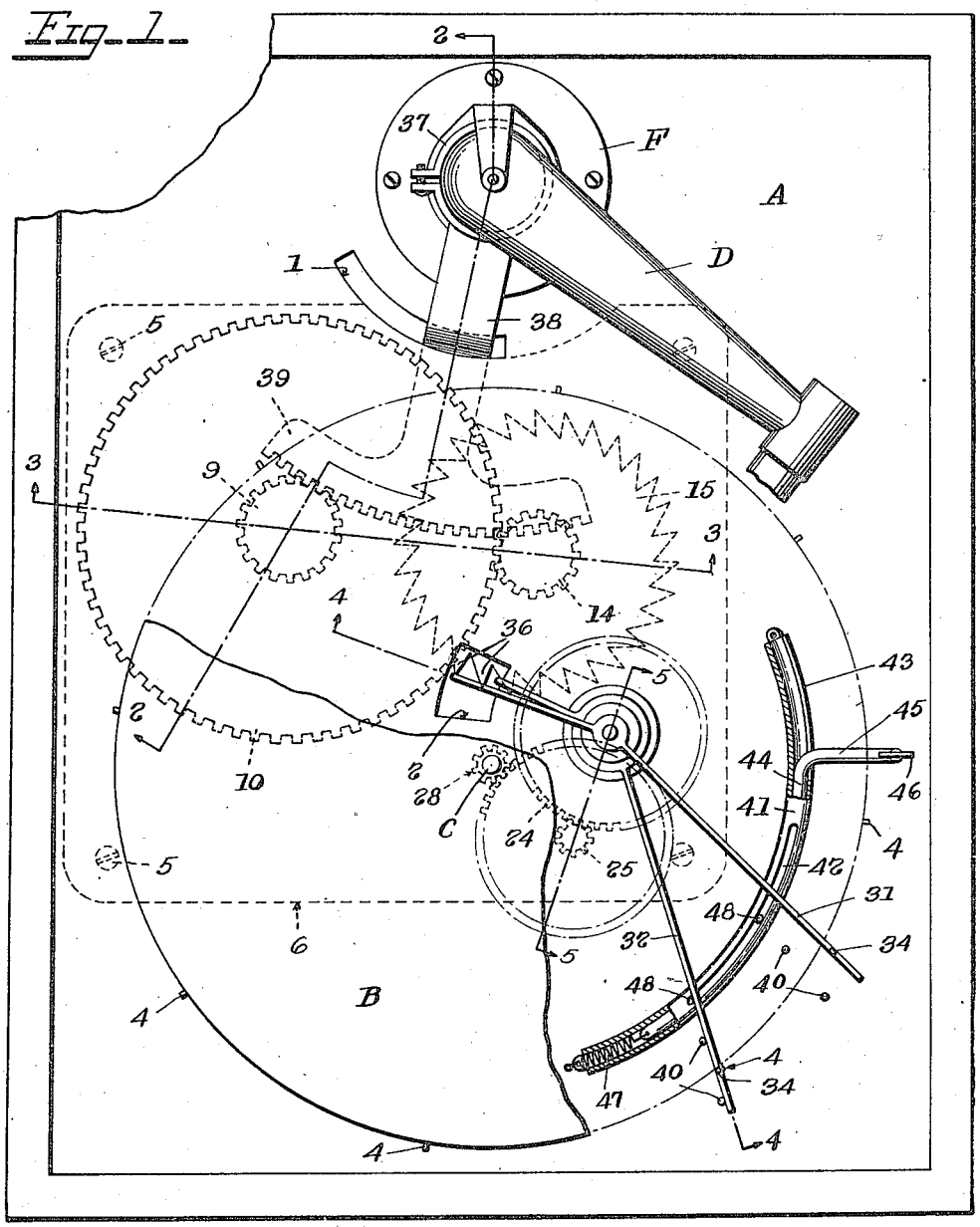

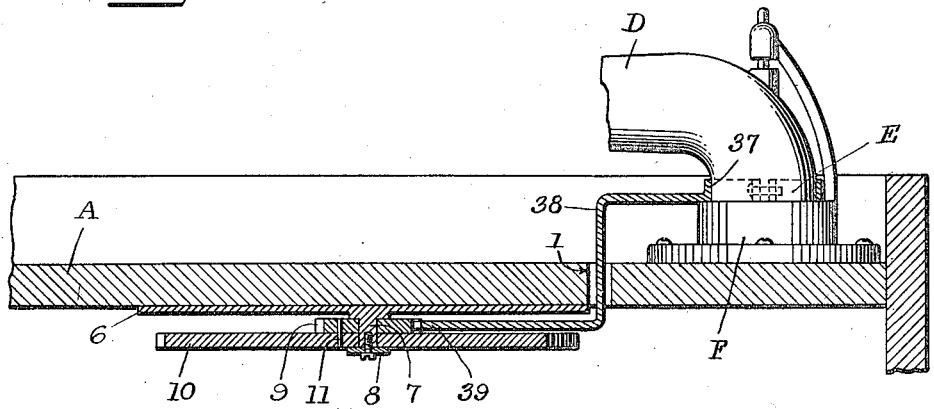
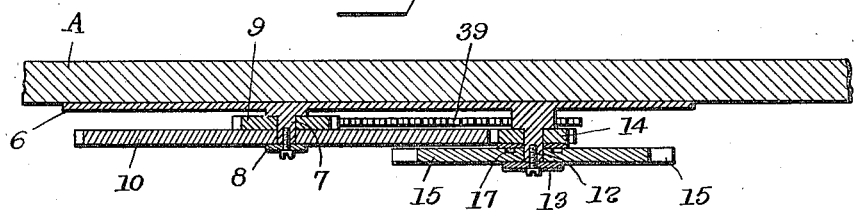
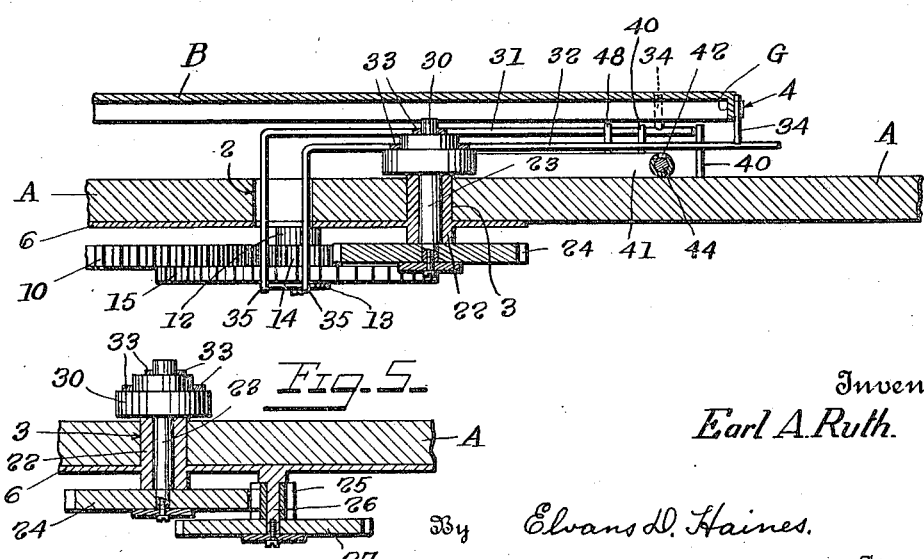

1,473,125

UNITED STATES PATENT OFFICE.

EARL A. RUTH, OF WASHINGTON, DISTRICT OF COLUMBIA.

AUTOMATIC-STOP MECHANISM FOR PHONOGRAPHS.

Application filed April 9, 1921. Serial No. 459,992.

*To all whom it may concern:*

Be it known that I, EARL A. RUTH, a citizen of the United States, residing at Washington, in the District of Columbia, have invented certain new and useful Improvements in Automatic-Stop Mechanisms for Phonographs, of which the following is a specification.

This invention relates generally to stop mechanisms, and particularly to automatic stop mechanisms for phonographs.

The primary object of the invention is to provide a stop mechanism for phonographs which is operable automatically by the movement of the tone arm of the phonograph in traversing a record upon the turn table of the phonograph, one which requires no setting and which operates regardless of the size of the record.

Another object of the invention is to provide a stop mechanism of this character in which the tone arm of the phonograph may be moved to its initial position adjacent the edge of the turn table to permit the record to be changed without causing the stop mechanism to be moved into inoperative position.

A further object of the invention is to provide a stop mechanism for phonographs having the foregoing mentioned desirable features, and in addition thereto, the desirable feature of being provided with manually operated means for moving the stop mechanism out of operative position when the tone arm is in its initial position, whereby to permit the turn table to commence rotating.

A still further object of the invention is to provide in an automatic stop mechanism for phonographs, an improved type of brake mechanism or stop mechanism per se.

An additional object of the invention is to generally improve upon the heretofore known mechanisms of a similar nature by the provision of a mechanism which is of comparatively simple, durable and inexpensive construction, one which is efficient and reliable in operation and well adapted for the purposes for which it is designed.

With the foregoing and other objects in view, the invention resides in the novel features of construction and the combination and arrangement of parts, as hereinafter fully described and claimed and shown in the accompanying drawings, in which similar reference characters are used to designate corresponding parts throughout the several views.

In the drawings which form a part of this specification:—

Fig. 1 is a plan view looking down upon the top of a well known type of phonograph, illustrating the present invention applied thereto;

Fig. 2 is a vertical sectional view taken on the irregular line 2—2 of Fig. 1;

Fig. 3 is a similar view taken on the plane indicated by the line 3—3 of Fig. 1;

Fig. 4 is a similar view taken on the irregular line 4—4 of Fig. 1;

Fig. 5 is a similar view taken on the plane indicated by the line 5—5 of Fig. 1;

Fig. 6 is a plan view of a unit of the improved mechanism, said view looking upon said unit from the bottom thereof;

Fig. 7 is a plan view of the central portion of the toothed wheel, and the pinion which has a clutched engagement therewith, said pinion being partly broken away and in section;

Fig. 8 is a vertical sectional view taken on the plane indicated by the line 8—8 of Fig. 7;

Fig. 9 is a similar view taken on the plane indicated by the line 9—9 of Fig. 8; and Fig. 10 is a perspective view of one of the stop or brake arms.

Referring more particularly to the drawings, the letter A designates the top of the motor cabinet of a phonograph, B and C the turn table and the turn table spindle thereof, and D the tone arm which has its vertical portion E turnably mounted in a bearing F carried by the top A of the motor cabinet so as to swing in the usual manner partly across the turn table B. These parts are all of the usual construction, and therefore form no part of the present invention, except in combination with the improved mechanism.

The top A of the motor cabinet is, however, slightly modified by being provided at a convenient point adjacent the bearing F with an arcuate slot 1, which has its curvature concentric to the axis of swing of the tone arm D. The top A is further modified by a four sided opening 2 and a circular opening 3 at convenient points adjacent the point where the turn table spindle C passes therethrough.

The turn table B is also slightly modified to the extent that it has on its peripheral flange a series of outwardly extending circumferentially spaced projections 4.

Fastened to the lower side of the top A of the motor cabinet in any suitable manner, for instance, by means of screws 5 is a plate 6, which may be of any desired shape so as to not interfere with any part of the phonograph mechanism. As shown, this plate 6 is substantially square shaped and has its rear edge cut inwardly so as to substantially partly coincide with the forward edge of the slot 1 in the top A.

Formed on the plate 6 and depending therefrom is a bearing stud 7, between the inner shouldered end of which and a washer plate 8 screwed to its free end, is rotatably mounted a pinion 9 and a gear wheel 10. The pinion 9 and the gear wheel 10 are fixed together by a suitable pin 11 so as to operate in unison.

Formed also upon the lower side of the plate 6 and depending therefrom is another bearing stud 12, between the inner shouldered end of which and a washer plate 13 screwed to its free end, is rotatably mounted a pinion 14 and a toothed member or wheel 15, this pinion 14 meshing with the gear wheel 10. The pinion 14 is disposed above the wheel 15 and has mounted thereon on its lower side in any suitable manner, a pair of diametrically disposed pawls 16 which are engageable with recesses 17 formed in the upper side of the wheel 15. This arrangement forms a clutched connection between the pinion 14 and the wheel 15, so that when the pinion 14 is rotating in one direction, rotation will be imparted to the wheel 15, but when the pinion 14 is rotating in the reverse direction the wheel 15 may remain stationary.

While the pawls 16 may be of any suitable construction and may be mounted upon the pinion 14 in any suitable manner, yet they are preferably provided at one of their ends with trunnions 18, which are retained in recesses 19 formed upon the lower side of the pinion 14 by means of a plate 20 screwed to the lower side of said pinion 14. The plate 20 is provided with openings 21, through which the swinging pawls 16 extend.

The plate 6 is further provided with an upwardly and downwardly extending bearing 22, the upwardly extending portion of which extends through the foregoing mentioned opening 3 in the top A of the motor cabinet.

Revolubly mounted in the bearing 22 is a shaft 23, which has screwed or otherwise fixed upon its lower end a gear wheel 24. This gear wheel 24 meshes with a pinion 25 mounted upon a bearing stud 26 depending from the plate 6. Fixed to the pinion 25 so as to rotate therewith is a gear wheel 27, which meshes with a pinion 28 fixed upon the turn table spindle C. Incidentally it will be stated that the plate 6 is provided with an opening 29 to allow for the passage of the turn table spindle C therethrough.

Fixed upon the upper end of the shaft 23 or formed integrally therewith, whichever is desired, is a stepped member 30, and frictionally fitted upon this member 30 upon its smallest and intermediate steps are arms 31 and 32. To provide for the connection of the arms 31 and 32 with the member 30, said arms are formed intermediate of their ends with ring shaped hubs 33, as clearly shown in Fig. 10.

The arms 31 and 32 are obviously disposed above the top A of the motor cabinet, but beneath the turn table B. However, they have one of their ends extending beyond the flange G of the turn table B, and they are provided adjacent these ends with upstanding projections 34. The other ends of the arms 31 and 32 are bent downwardly as at 35, and these downturned portions are engaged by teeth 36 formed at the periphery of the wheel 15. These teeth 36 are arranged similarly to the teeth upon an ordinary ratchet wheel, that is, one of their edges are disposed radially while their other edges are disposed angularly to their radial edges.

As shown in Figs. 1 and 4 the shorter portions of the arms 31 and 32 are of unequal lengths, so that the downturned portions 35 are spaced apart at approximately one and a half times the distance between two adjacent teeth 36 on the wheel 15. By this construction it will be seen that one or the other of the arms 31 and 32 will be permitted to move into the space between two adjacent teeth of the wheel 15 irrespective of the position of the latter.

Clamped around the vertically disposed portion E of the tone arm D is a split ring 37 carrying a laterally extending arm 38, which is bent downwardly through the slot 1 and then horizontally, and which has on its free end a segmental gear 39 meshing with the pinion 9.

The arms 31 and 32 in moving between adjacent teeth 36 on the wheel 15, move so that their projections 34 are disposed in the path of the projections 4 on the flange G of the turn table B so as to engage said projections 4 and arrest the movement of the turn table B. When in this position the arms are braced by pairs of pins 40 driven into the top A of the motor cabinet.

Mounted upon the upper side of the top A of the motor cabinet beneath the turn table B is an arcuate tube 41 having a slot 42 at its top and a slot 43 at its outer side and extending from one end. Slidably mounted in this tube is an arcuate rod 44, one end of which is outturned as at 45 to pass beyond the edge of the turn table B, where it is provided with a finger piece 46. The other end of the rod 44 is connected to one end of a coil spring 47, the other end of which is anchored in any suitable manner to the top A of the motor cabinet. Fixed to the intermediate portion of the rod 44 is a pair of pins 48, which project upwardly through the slot 42 in the tube 41. These pins 48 are disposed in front of the arms 31 and 32.

The operation of the device is as follows:—

Assuming the parts to be in the position shown in Fig. 1, that is, with the arm 32 having its projection 34 in engagement with a projection 4 on the flange G of the turn table B so that the latter is at rest, and with its portion 35 disposed between two adjacent teeth 36 of the wheel 15, and with the tone arm D in its initial position adjacent the edge of the turn table B, should it be desired to play a record placed upon the turn table B, it would only be necessary to engage the finger piece 46 and push it rearwardly. The consequent movement to the rear of the rod 44 causes the pins 48 to engage the arms 31 and 32 and swing them free from engagement with the projection 4 on the flange G of the turn table B and permit the latter to rotate.

The tone arm D in traversing a record on the turn table B will continuously rotate the wheel 15 at such a speed through the medium of the gear 39, pinion 9, gear 10, pinion 14, pawls 16 and recesses 17, that the wheel 15 will maintain the arms 31 and 32 at its periphery, although said arms will have a tendency to alternately swing in between adjacent teeth of the wheel 15. As long as the wheel 15 is rotating, its teeth 36 will maintain the arms 31 and 32 at its periphery so that said arms will not be in position to engage any of the projections 4 on the rim of the turn table B and cause the latter to cease rotating.

When the stylus carried by the tone arm D reaches the end of the music groove in the record so that the tone arm ceases to swing, rotation of the wheel 15 will cease.

The turn table spindle C still rotating and rotating the step member 30 through the medium of the pinion 28, gear 27, pinion 25 and gear 24, causes whichever of the arms 31 and 32 that is disposed opposite the space between the points of two adjacent teeth 36 of the wheel 15 to swing between said teeth under the friction between that arm and the member 30. This arm in thus swinging, places its projection 34 in the path of the projections 4 on the flange G of the turn table and when engaged by one of them stops the rotation of the turn table.

It will be here pointed out that the gearing which drives the member 30 is speed reducing gearing, so that the member 30 will be driven very slowly.

The parts being at rest, the tone arm may be swung back across the turn table to its initial position so that the record may be changed. In thus swinging the tone arm the gearing interposed between it and the wheel 15 would be driven in the reverse direction, but the clutched connection of the pinion 14 with the wheel 15 would permit the latter to remain stationary to maintain the turn table at rest until again started in the hereinbefore explained manner.

It will be noted that the rearward movement of the rod 44 moves the arms 31 and 32 sufficiently free from engagement by the teeth 36 of the wheel 15, so as to allow sufficient time for the stylus to be applied to the record before the arms again move under the influence of the teeth 36 of the wheel 15, which as hereinbefore explained maintains them out of operative engagement with the turn table while said wheel is rotating.

From the foregoing description taken in connection with the drawings it will be seen that the objects of the invention have been effectively carried out, as the improved stop mechanism is entirely automatic and does not require setting, and furthermore, it operates effectively regardless of the size of the record.

As numerous changes in form, proportion, and in the various details of construction may be made without departing from the spirit and principle of the invention, it is to be understood that such may be done within the meaning and scope of the following claims.

What is claimed is:—

1. In a stop mechanism; the combination with a rotatable member, and a traveling member propelled thereby; of a normally applied brake for the rotatable member, and a movable member driven by the traveling member, the brake being mounted independently of the movable member, and the movable member being arranged in direct engagement with the brake to maintain the latter ineffective while moving and to permit the same to become effective when its movement ceases.

2. The combination with the turn table and tone arm of a phonograph, of a normally applied brake mechanism for the turn table, and a rotatable member driven by the tone arm, said brake mechanism being mounted upon the phonograph independently of said rotatable member, and said rotatable member being arranged in direct engagement with said brake mechanism to maintain the latter ineffective while rotating and to permit the same to become effective when its rotation ceases.

3. The combination with the turn table and tone arm of a phonograph, of stop mechanism engageable with the turn table for arresting the movement thereof, a movable member engaging said stop mechanism and being provided with means for maintaining said stop mechanism out of operative engagement with the turn table while said member is moving, said means permitting said stop mechanism to move into operative engagement with the turn table when movement of said member ceases, and means for moving said member continuously from the movement of the tone arm in traversing a record upon the turn table.

4. The combination with the turn table and tone arm of a phonograph, of stop mechanism engageable with the turn table for arresting the movement thereof, a rotatable member engaging said stop mechanism and being provided with means for maintaining said stop mechanism out of operative engagement with the turn table while said member is rotating, said means permitting said stop mechanism to move into operative engagement with the turn table when rotation of said member ceases, and means for rotating said member from the movement of the tone arm in traversing a record upon the turn table.

5. The combination with the turn table and tone arm of a phonograph, of stop mechanism engageable with the turn table for arresting the movement thereof, a toothed rotatable member engaging said stop mechanism, and means for rotating said member from the movement of the tone arm in traversing a record upon the turn table and at a rate of speed sufficient to maintain said stop mechanism out of operative engagement with the turn table while said member is rotating.

6. The combination with the turn table and tone arm of a phonograph, of a stop member engageable with the turn table for arresting the movement thereof, and a toothed wheel having a driving connection with the tone arm so as to be rotated by the movement of the latter in traversing a record on the turn table, said wheel engaging said member and while rotating maintaining the latter out of operative engagement with the turn table but permitting said member to operatively engage said turn table when it ceases to rotate.

7. The combination with the turn table and tone arm of a phonograph, of a swinging stop member engageable with the turn table for arresting the movement thereof, a wheel having a driving connection with the tone arm so as to be rotated by the movement of the latter in traversing a record on the turn table, and means carried by said wheel and engaging said member for maintaining the latter out of operative engagement with the turn table while said wheel is rotating, said means permitting said member to swing into operative engagement with the turn table when said wheel ceases to rotate.

8. The combination with the turn table and tone arm of a phonograph, of a swinging stop member engageable with the turn table for arresting the movement thereof, a wheel having a driving connection with the tone arm so as to be rotated by the movement of the latter in traversing a record on the turn table, and a series of teeth on said wheel and engaging said member and maintaining the latter out of operative engagement with the turn table while said wheel is rotating, said teeth receiving a portion of said member therebetween when said wheel ceases to rotate, whereby to permit said member to swing into operative engagement with the turn table.

9. The combination with the turn table and tone arm of a phonograph, of a pair of swinging stop members engageable with the turn table for arresting the movement thereof, a wheel having a driving connection with the tone arm so as to be rotated by the movement of the latter in traversing a record on the turn table, and a series of teeth formed on said wheel and engaging said members for maintaining both of the latter out of operative engagement with the turn table while said wheel is rotating, said teeth receiving a portion of one or the other of said members therebetween when said wheel ceases to rotate whereby to permit that member to swing into operative engagement with the turn table.

10. The combination with the turn table and tone arm of a phonograph, of a stop member engageable with the turn table for arresting the movement thereof, a rotatable wheel, gearing interposed between the tone arm and said wheel for rotating the latter from the movement of the tone arm in traversing a record on the turn table, and means carried by said wheel and engaging said member for maintaining the latter out of operative engagement with the turn table while said wheel is rotating, said means permitting said member to move into operative engagement with the turn table when said wheel ceases to rotate.

11. The combination with the turn table and tone arm of a phonograph, of a stop member engageable with the turn table for arresting the movement thereof, a rotatable wheel, a segmental gear carried by the tone arm, speed multiplying gearing interposed between said gear and said wheel for rotating the latter from the movement of the tone arm in traversing a record on the turn table, and means carried by said wheel and engaging said member for maintaining the latter out of operative engagement with the turn table while said wheel is rotating, said means permitting said member to move into operative engagement with the turn table when said wheel ceases to rotate.

12. The combination with the turn table and tone arm of a phonograph, of a stop member engageable with the turn table for arresting the movement thereof, a rotatable wheel, gearing coupled to the tone arm for operation therefrom, means between said gearing and said wheel for causing the latter to rotate in one direction as the gearing is driven in one direction by the movement of the tone arm in traversing a record on the turn table, said means permitting said wheel to remain stationary when said gearing is driven in the reverse direction by the movement of the tone arm to its initial position, and means carried by said wheel and engaging said member to maintain the latter out of operative engagement with the turn table while said wheel is rotating, said means permitting said member to move into operative engagement with the turn table when said wheel ceases to rotate.

13. The combination with the turn table and tone arm of a phonograph, of a stop member engageable with the turn table for arresting the movement thereof, a rotatable wheel, gearing coupled to the tone arm for operation therefrom, clutch mechanism between said gearing and said wheel for causing the latter to rotate in one direction as said gearing is driven in one direction from the movement of the tone arm in traversing a record on the turn table, said clutch mechanism permitting said wheel to remtain stationary when said gearing is driven in the reverse direction by the movement of the tone arm to its initial position, and means carried by said wheel and engaging said member for maintaining the latter out of operative engagement with the turn table while said wheel is rotating, said means permitting said member to move into operative engagement with the turn table when said wheel ceases to rotate.

14. The combination with the turn table and tone arm of a phonograph, of a stop member engageable with the turn table for arresting the movement thereof, a rotatable wheel, gearing coupled to the tone arm for operation therefrom, swinging pawls mounted on said gearing and engageable with said wheel for causing the latter to rotate in one direction as said gearing is driven in one direction by the movement of the tone arm in traversing a record on the turn table, said pawls permitting said wheel to remain stationary when said gearing is driven in the reverse direction by the movement of the tone arm to its initial position, and means carried by said wheel and engaging said member for maintaining the latter out of operative engagement with the turn table while said wheel is rotating, said means permitting said member to move into operative engagement with the turn table when said wheel ceases to rotate.

15. The combination with the turn table and tone arm of a phonograph, of stop mechanism engageable with the turn table for arresting the movement thereof, means controlled by the movement of the tone arm for maintaining said stop mechanism out of operative engagement with the turn table while the tone arm is traversing a record on the turn table, said means permitting said stop mechanism to move into operative engagement with the turn table when the tone arm ceases to traverse the record, and manually operated means for moving said stop mechanism out of operative engagement with the turn table.

16. The combination with the turn table and tone arm of a phonograph, of a swinging stop member engageable with the turn table for arresting the movement thereof, means controlled by the movement of the tone arm for maintaining said stop member out of operative engagement with the turn table while the tone arm is traversing a record on the turn table, said means permitting said stop member to move into operative engagement with the turn table when the tone arm ceases to traverse the record, and a manually operated movable member engageable with said stop member for swinging the latter out of operative engagement with the turn table.

17. The combination with the turn table and tone arm of a phonograph, of a swinging stop arm engageable with the edge of the turn table for arresting the movement thereof, means controlled by the movement of the tone arm for maintaining said stop arm out of operative engagement with the turn table while the tone arm is traversing a record on the turn table, said means permitting said stop arm to swing into operative engagement with the turn table when the tone arm ceases to traverse the record, a slidable member provided with a finger piece by which it may be manually operated, and a projection on said member engageable with said stop arm for swinging the latter out of operative engagement with the turn table.

18. The combination with the turn table and tone arm of a phonograph, of a swinging stop arm engageable with the turn table for arresting the movement thereof, means controlled by the movement of the tone arm for maintaining said stop arm out of operative engagement with the turn table while the tone arm is traversing a record on the turn table, said means permitting said stop arm to swing into operative engagement with the turn table when the tone arm ceases to traverse the record, a stationary tube disposed beneath the turn table, a rod slidably mounted in said tube, a finger piece carried by said rod for operating the same, and a projection on said rod and engageable with said stop arm for swinging the latter out of operative engagement with the turn table.

19. The combination with the turn table and tone arm of a phonograph, of a rotatable member, a stop arm engageable with the turn table for arresting the movement thereof, said arm being frictionally fitted upon said member whereby it is maintained biased to engagement with the turn table, and means controlled by the movement of the tone arm for maintaining said stop arm out of operative engagement with the turn table while the tone arm is traversing a record on the latter, said means permitting said stop arm to be swung by said rotatable member into operative engagement with the turn table when the tone arm ceases to traverse the record.

20. The combination with the turn table, turn table spindle and tone arm of a phonograph, of a rotatable member having a driving connection with the turn table spindle, a stop arm engageable with the turn table for arresting the movement thereof, said stop arm being frictionally fitted upon said member whereby it is maintained biased to engagement with the turn table, and means controlled by the movement of the tone arm for maintaining said stop arm out of operative engagement with the turn table while the tone arm is traversing a record on the latter, said means permitting said stop arm to be swung by said rotatable member into operative engagement with the turn table when the tone arm ceases to traverse the record.

21. The combination with the turn table, turn table spindle and tone arm of a phonograph, of a rotatable member, speed reducing gearing between said member and the turn table spindle, a stop arm engageable with the turn table for arresting the movement thereof, said stop arm being frictionally fitted upon said member whereby it is maintained biased to engagement with the turn table, and means controlled by the movement of the tone arm for maintaining said stop arm out of operative engagement with the turn table while the tone arm is traversing a record on the latter, said means permitting said stop arm to be swung by said rotatable member into operative engagement with the turn table when the tone arm ceases to traverse the record.

22. The combination with the turn table and tone arm of a phonograph, of stop mechanism engageable with the turn table for arresting the movement thereof, a movable member controlled by the movement of the tone arm in traversing a record on the turn table, means carried by said member for maintaining said stop mechanism out of operative engagement with the turn table while said member is moving, said means permitting said stop mechanism to operatively engage the turn table when movement of said member ceases, and manually operated means for moving said stop mechanism out of operative engagement with the turn table to permit the latter to commence rotating, the last named means moving said stop mechanism sufficiently free from engagement by the first named means to allow sufficient time for applying the stylus of the phonograph to the record before said stop mechanism again moves into engagement with the first named means, by which said stop mechanism is maintained out of operative engagement with said turn table while said member is moving.

In testimony whereof I affix my signature.

EARL A. RUTH.